(12) United States Patent
Fowe et al.

(10) Patent No.: US 11,514,780 B2
(45) Date of Patent: Nov. 29, 2022

(54) METHOD, APPARATUS AND COMPUTER PROGRAM PRODUCT FOR DEFINING A STRAND UPSTREAM OF A DIRECTION-BASED TRAFFIC LINK

(71) Applicant: HERE GLOBAL B.V., Eindhoven (NL)

(72) Inventors: James Fowe, Chicago, IL (US); Aditya Balasaheb Jadhav, Chicago, IL (US); Earl Hammond, Chicago, IL (US)

(73) Assignee: HERE GLOBAL B.V., Eindhoven (FI)

( * ) Notice: Subject to any disclaimer, the term of this patent is extended or adjusted under 35 U.S.C. 154(b) by 327 days.

(21) Appl. No.: 16/696,464

(22) Filed: Nov. 26, 2019

(65) Prior Publication Data

US 2021/0158695 A1 May 27, 2021

(51) Int. Cl.
| | | |
|---|---|---|
| *G08G 1/052* | (2006.01) | |
| *G08G 1/01* | (2006.01) | |
| *H04L 12/725* | (2013.01) | |
| *H04W 72/04* | (2009.01) | |
| *H04W 72/08* | (2009.01) | |
| *H04W 4/44* | (2018.01) | |
| *H04L 45/302* | (2022.01) | |

(52) U.S. Cl.
CPC .......... *G08G 1/052* (2013.01); *G08G 1/0116* (2013.01); *G08G 1/0133* (2013.01); *G08G 1/0145* (2013.01); *H04L 45/3065* (2013.01); *H04W 4/44* (2018.02); *H04W 72/0413* (2013.01); *H04W 72/08* (2013.01)

(58) Field of Classification Search
CPC .......... G08G 1/052; G08G 1/01; G08G 1/056; G08G 1/0116; G08G 1/0133; G08G 1/0145; H04W 4/44; H04W 72/0413; H04W 72/08; H04L 45/3065
See application file for complete search history.

(56) References Cited

U.S. PATENT DOCUMENTS

| | | | |
|---|---|---|---|
| 7,576,661 B2 | 8/2009 | Mochizuki | |
| 8,600,650 B2 | 12/2013 | Zaitsu et al. | |
| 9,576,481 B2 | 2/2017 | Xu et al. | |
| 9,640,071 B2 | 5/2017 | Fowe et al. | |

(Continued)

OTHER PUBLICATIONS

Extended European Search Report for European Application No. 20209839.8 dated May 28, 2021, 12 pages.

(Continued)

*Primary Examiner* — Peter D Nolan
*Assistant Examiner* — Demetra R Smith-Stewart
(74) *Attorney, Agent, or Firm* — Peter H. Yu; Here Technologies

(57) ABSTRACT

A method, apparatus and computer program product are provided to define a strand upstream of a direction based traffic (DBT) link. In a method, a strand is defined upstream of a DBT link. The method includes extending the strand so as to include one or more links upstream of the DBT link. The strand is extended by determining whether a link is to be added to the strand based upon evaluation of a termination criteria. The termination criteria is at least partially based upon a relationship of a function class of the link to the function class of one or more other links. In an instance in which the termination criteria is satisfied, the method ceases further extension of the strand.

14 Claims, 4 Drawing Sheets

(56) References Cited

U.S. PATENT DOCUMENTS

| | | | |
|---|---|---|---|
| 9,659,491 B2 | 5/2017 | Fowe | |
| 9,672,735 B2 | 6/2017 | Fowe | |
| 10,760,918 B2* | 9/2020 | Fowe | G08G 1/0133 |
| 2016/0171885 A1* | 6/2016 | Lynch | G08G 1/096716 |
| | | | 701/117 |
| 2016/0275786 A1 | 9/2016 | Fowe | |
| 2017/0004707 A1 | 1/2017 | Fowe et al. | |
| 2017/0191834 A1 | 7/2017 | Fowe | |
| 2018/0033296 A1 | 2/2018 | Fowe | |
| 2018/0174447 A1 | 6/2018 | Pellolio et al. | |
| 2020/0025584 A1* | 1/2020 | Fowe | G08G 1/0112 |
| 2020/0273328 A1* | 8/2020 | Mubarek | G01C 21/3492 |
| 2021/0134149 A1* | 5/2021 | Mubarek | H04W 4/44 |

OTHER PUBLICATIONS

Road Traffic Analytics & Location Intelligence | Here [online] [retrieved Feb. 7, 2020]. Retrieved via the Internet: https://www.here.com/products/traffic-solutions/real-time-traffic-information (dated 2020) 6 pages.

Li, L. et al., *Extraction of Road Intersections From GPS Traces Based on the Dominant Orientations at Roads*, ISPRS Int. J. Geo-Inf. 6, 403 (2017) 16 pages.

Partial European Search Report for European Application No. 20209839.8 dated Mar. 11, 2021, 14 pages.

\* cited by examiner

METHOD, APPARATUS AND COMPUTER PROGRAM PRODUCT FOR DEFINING A STRAND UPSTREAM OF A DIRECTION-BASED TRAFFIC LINK

TECHNOLOGICAL FIELD

An example embodiment relates generally to a method, apparatus and computer program product for defining a strand upstream of a direction-based traffic (DBT) link.

BACKGROUND

Many traffic-aware routing and navigation systems utilize link-level traffic information. In instances in which a link, such as a segment of a road, includes a plurality of lanes, the link-level traffic information is oftentimes not specific as to individual lanes of the link. Instead, link-level traffic information may include speeds that are the statistical average speed of vehicles driving along the different lanes of the link. As the vehicles driving along the different lanes of a link are proceeding along different routes, the vehicles may have similar speeds in some instances, but very divergent speeds in other instances. These differences between traffic behavior in the different lanes of a link may be most pronounced at intersections, such as busy arterial intersections, in which the average speed at the link-level does not represent the actual average speed at the lane level for at least some of the lanes of the link. For example, in an instance in which one lane of a link is a left turn lane and another lane of the same link proceeds in a straight direction, the speed of the vehicles in the left turn lane may be significantly less than the speed of the vehicles in the lane proceeding in a straight direction. As a result, the link-level traffic information including, for example, the speed of the traffic supported by the link, such as the average speed of travel along the link, may not be representative of the behavior of the vehicles in at least some lanes of the link.

Although lane-level traffic information is not generally available for all links of a road system in the same manner that lane-level traffic information is more readily available, lane-level traffic information is more often available for certain types of links. For example, a DBT link is the link immediately upstream of an intersection that includes two or more downstream links supporting traffic flow during the same period of time with divergent speeds, such as speeds that are sufficiently divergent to be published as lane-level congestion in a turn direction. Lane-level information is more generally available for a DBT link than for other more upstream links that are further removed from the intersection. The lane-level information for the DBT link captures differences in its lane-level traffic behavior, such as may be occasioned by the different routes taken by the vehicles through the intersection with which the DBT link is associated.

The different routes taken by vehicles through the intersection may not only cause the behavior, such as the speed, of the vehicles traveling along the different lanes of the DBT link to vary, but may also cause the behavior, such as the speed, of vehicles in different lanes of the links upstream of the DBT link to also be affected and to correspondingly differ from lane to lane. However, lane-level traffic information for the links upstream of a DBT link is not as routinely available. As such, the lane-level traffic information that is more generally available for the links upstream of a DBT link must generally be referenced even though this lane-level traffic information is not sufficiently granular to accurately and consistently represent the differences in vehicle behavior, such as the average speed, in the different lanes of the links upstream of a DBT link.

BRIEF SUMMARY

A method, apparatus and computer program product are provided in accordance with an example embodiment in order to define a strand upstream of a DBT link. A strand may be defined to include the one or more links upstream of the DBT link that may be affected or at least most affected by lane-specific traffic conditions of the DBT link and the intersection with which the DBT link is associated. By defining the strand upstream of the DBT link, lane-specific traffic information may be obtained for the one or more links of the strand, thereby providing more useful traffic information for vehicles approaching the intersection without requiring lane-specific traffic information be collected and processed for all links, such as those links that are more remote from an intersection and that are not impacted by the traffic conditions of the DBT link and the associated intersection. As such, the method, apparatus and computer program product of an example embodiment define a strand of link(s) upstream of the DBT link for which lane-level traffic information would be most valuable, thereby facilitating prioritization of the collection and processing of lane-level traffic information for the link(s) of the strand relative to other links of a road network.

In an example embodiment, a method is provided for defining a strand upstream of a direction based traffic (DBT) link. The method includes extending the strand so as to include one or more links upstream of the DBT link. In this regard, the strand is extended by determining whether a link is to be added to the strand based upon evaluation of a termination criteria. The termination criteria is at least partially based upon a relationship of a function class of the link to the function class of one or more other links. In an instance in which the termination criteria is satisfied, the method ceases further extension of the strand.

In an instance in which the link is associated with an intersection upstream of the DBT link, the termination criteria is at least partially based upon a difference in the function class of the link and the function class of the one or more other links associated with the intersection. In this example embodiment and in an instance in which the termination criteria is not satisfied, the strand is extended by extending the strand through the intersection to a selected link of the one or more other links that is selected based upon the function class of the selected link relative to the function class of the one or more other links associated with the intersection. The selected link may be selected based upon the function class of the selected link being the smallest of the function classes of the one or more other links associated with the intersection. The termination criteria of an example embodiment is at least partially based upon the function class of the link differing from the function class of at least a predetermined number of the one or more other links by at least a predefined amount. The termination criteria may also be based on a length of the strand and/or on whether the link is associated with a stop sign or a stop light.

In another example embodiment, an apparatus is provided for defining a strand upstream of a direction based traffic (DBT) link. The apparatus includes at least one processor and at least one non-transitory memory including computer program code instructions with the computer program code instructions configured to, when executed by the at least one processor, cause the apparatus to extend the strand so as to include one or more links upstream of the DBT link The strand is extended by determining whether a link is to be added to the strand based upon evaluation of a termination criteria. The termination criteria is at least partially based upon a relationship of a function class of the link to the function class of one or more other links. In an instance in which the termination criteria is satisfied, the computer program code instructions are also configured cease further extension of the strand.

In an example embodiment and in an instance in which the link is associated with an intersection upstream of the DBT link, the termination criteria is at least partially based upon a difference in the function class of the link and function class of one or more other links associated with the intersection. In an instance in which the termination criteria is not satisfied, the computer program code instructions of an example embodiment that are configured to extend the strand include computer program code instructions configured to extend the strand through the intersection to a selected link of the one or more other links that is selected based upon the function class of the selected link relative to the function class of the one or more other links associated with the intersection. In an example embodiment, the selected link is selected based upon the function class of the selected link being the smallest of the function classes of the one or more other links associated with the intersection. The termination criteria of an example embodiment is at least partially based upon the function class of the link differing from the function class of at least a predetermined number of the one or more other links by at least a predefined amount. In an example embodiment, the termination criteria is also based on a length of the strand and/or on whether the link is associated with a stop sign or a stop light.

In a further example embodiment, a computer program product is provided for defining a strand upstream of a direction based traffic (DBT) link. The computer program product include at least one non-transitory computer-readable storage medium having computer-executable program code instructions stored therein with the computer-executable program code instructions configured to extend the strand so as to include one or more links upstream of the DBT link. In this regard, the strand is extended by determining whether a link is to be added to the strand based upon evaluation of a termination criteria. The termination criteria is at least partially based upon a relationship of a function class of the link to the function class of one or more other links. In an instance in which the termination criteria is satisfied, the computer-executable program code instructions are also configured to cease further extension of the strand.

In an instance in which the link is associated with an intersection upstream of the DBT link, the termination criteria is at least partially based upon a difference in the function class of the link and the function class of the one or more other links associated with the intersection. In this example embodiment and in an instance in which the termination criteria is not satisfied, the strand is extended by extending the strand through the intersection to a selected link of the one or more other links that is selected based upon the function class of the selected link relative to the function class of the one or more other links associated with the intersection. The selected link may be selected based upon the function class of the selected link being the smallest of the function classes of the one or more other links associated with the intersection. The termination criteria of an example embodiment is at least partially based upon the function class of the link differing from the function class of at least a predetermined number of the one or more other links by at least a predefined amount. The termination criteria may also be based on a length of the strand and/or on whether the link is associated with a stop sign or a stop light.

In yet another example embodiment, an apparatus is provided for defining a strand upstream of a direction based traffic (DBT) link. The apparatus includes means for extending the strand so as to include one or more links upstream of the DBT link. In this regard, the strand is extended by determining whether a link is to be added to the strand based upon evaluation of a termination criteria. The termination criteria is at least partially based upon a relationship of a function class of the link to the function class of one or more other links. In an instance in which the termination criteria is satisfied, the apparatus also includes means for ceasing further extension of the strand.

In an instance in which the link is associated with an intersection upstream of the DBT link, the termination criteria is at least partially based upon a difference in the function class of the link and the function class of the one or more other links associated with the intersection. In this example embodiment and in an instance in which the termination criteria is not satisfied, the strand is extended by extending the strand through the intersection to a selected link of the one or more other links that is selected based upon the function class of the selected link relative to the function class of the one or more other links associated with the intersection. The selected link may be selected based upon the function class of the selected link being the smallest of the function classes of the one or more other links associated with the intersection. The termination criteria of an example embodiment is at least partially based upon the function class of the link differing from the function class of at least a predetermined number of the one or more other links by at least a predefined amount. The termination criteria may also be based on a length of the strand and/or on whether the link is associated with a stop sign or a stop light.

In an example embodiment, a method is provided for selecting one or more direction based traffic (DBT) intersections for DBT topology stranding. The method includes determining, for each of a plurality of time epochs, a representation of a turning speed in a downstream direction for traffic in each of a plurality of lanes of a link immediately upstream of a DBT intersection. For each of the plurality of time epochs, the method includes determining a ratio of a first representation of the turning speed for traffic in a first lane of the link to a second representation of the turning speed for traffic in a second lane of the link. The method also includes determining a speed ratio for the DBT intersection based upon the ratios that are determined for each of the plurality of time epochs and selecting one or more DBT intersections for DBT topology stranding based upon the speed ratio for the one or more DBT intersections.

The method of an example embodiment determines the representation of the turning speed by determining an average turning speed in the downstream direction for traffic in each of the plurality of lanes of the link immediately upstream of the DBT intersection. In an example embodiment, the first and second representations of the turning speed comprise the highest and lowest average turning speeds, respectively, of the average turning speeds determined for the plurality of lanes of the link immediately upstream of the DBT intersection. In this example embodiment, the method determines the ratio by determining the ratio of the highest average turning speed to the lowest average turning speed for the plurality of lanes of the link immediately upstream of the DBT intersection. The method of this example embodiment determines the speed ratio by determining an average of the ratios of the highest average turning speed to the lowest average turning speed for the plurality of lanes of the link immediately upstream of the DBT intersection for each of the plurality of time epochs.

The method of an example embodiment determines the representation of the turning speed based upon historical data regarding traffic in each of the plurality of lanes of the link immediately upstream of the DBT intersection for each of a plurality of time epochs. In an example embodiment, the method also includes ranking the one or more DBT intersections based upon the speed ratio for the one or more DBT intersections prior to selecting the one or more DBT intersections.

In an example embodiment, an apparatus is provided for selecting one or more direction based traffic (DBT) intersections for DBT topology stranding. The apparatus includes at least one processor and at least one non-transitory memory including computer program code instructions with the computer program code instructions configured to, when executed by the at least one processor, cause the apparatus to determine, for each of a plurality of time epochs, a representation of a turning speed in a downstream direction for traffic in each of a plurality of lanes of a link immediately upstream of a DBT intersection. For each of the plurality of time epochs, the computer program code instructions are also configured to determine a ratio of a first representation of the turning speed for traffic in a first lane of the link to a second representation of the turning speed for traffic in a second lane of the link. The computer program code instructions are further configured to determine a speed ratio for the DBT intersection based upon the ratios that are determined for each of the plurality of time epochs and to select one or more DBT intersections for DBT topology stranding based upon the speed ratio for the one or more DBT intersections.

The computer program code instructions configured to determine the representation of the turning speed may include computer program code instructions configured to determine an average turning speed in the downstream direction for traffic in each of the plurality of lanes of the link immediately upstream of the DBT intersection. In an example embodiment, the first and second representations of the turning speed comprise the highest and lowest average turning speeds, respectively, of the average turning speeds determined for the plurality of lanes of the link immediately upstream of the DBT intersection. In this example embodiment, the computer program code instructions configured to determine the ratio include computer program code instructions configured to determine the ratio of the highest average turning speed to the lowest average turning speed for the plurality of lanes of the link immediately upstream of the DBT intersection. In this example embodiment, the computer program code instructions configured to determine the speed ratio include computer program code instructions configured to determine an average of the ratios of the highest average turning speed to the lowest average turning speed for the plurality of lanes of the link immediately upstream of the DBT intersection for each of the plurality of time epochs.

The computer program code instructions of an example embodiment are configured to determine the representation of the turning speed based upon historical data regarding traffic in each of the plurality of lanes of the link immediately upstream of the DBT intersection for each of a plurality of time epochs. In an example embodiment, the computer program code instructions are also configured to rank the one or more DBT intersections based upon the speed ratio for the one or more DBT intersections prior to selecting the one or more DBT intersections.

In a further example embodiment, a computer program product is provided for selecting one or more direction based traffic (DBT) intersections for DBT topology stranding. The computer program product include at least one non-transitory computer-readable storage medium having computer-executable program code instructions stored therein with the computer-executable program code instructions configured to determine, for each of a plurality of time epochs, a representation of a turning speed in a downstream direction for traffic in each of a plurality of lanes of a link immediately upstream of a DBT intersection. For each of the plurality of time epochs, the computer-executable program code instructions are configured to determine a ratio of a first representation of the turning speed for traffic in a first lane of the link to a second representation of the turning speed for traffic in a second lane of the link. The computer-executable program code instructions are also configured to determine a speed ratio for the DBT intersection based upon the ratios that are determined for each of the plurality of time epochs and to select one or more DBT intersections for DBT topology stranding based upon the speed ratio for the one or more DBT intersections.

The computer-executable program code instructions may be configured to determine the representation of the turning speed by determining an average turning speed in the downstream direction for traffic in each of the plurality of lanes of the link immediately upstream of the DBT intersection. In an example embodiment, the first and second representations of the turning speed comprise the highest and lowest average turning speeds, respectively, of the average turning speeds determined for the plurality of lanes of the link immediately upstream of the DBT intersection. In this example embodiment, the computer-executable program code instructions may be configured to determine the ratio by determining the ratio of the highest average turning speed to the lowest average turning speed for the plurality of lanes of the link immediately upstream of the DBT intersection. In this example embodiment, the computer-executable program code instructions may be configured to determine the speed ratio by determining an average of the ratios of the highest average turning speed to the lowest average turning speed for the plurality of lanes of the link immediately upstream of the DBT intersection for each of the plurality of time epochs.

The computer-executable program code instructions may be configured to determine the representation of the turning speed based upon historical data regarding traffic in each of the plurality of lanes of the link immediately upstream of the DBT intersection for each of a plurality of time epochs. In an example embodiment, the computer-executable program code instructions are also configured to rank the one or more DBT intersections based upon the speed ratio for the one or more DBT intersections prior to selecting the one or more DBT intersections.

In yet another example embodiment, an apparatus is provided for selecting one or more direction based traffic (DBT) intersections for DBT topology stranding. The apparatus includes means for determining, for each of a plurality of time epochs, a representation of a turning speed in a downstream direction for traffic in each of a plurality of lanes of a link immediately upstream of a DBT intersection. For each of the plurality of time epochs, the apparatus includes means for determining a ratio of a first representation of the turning speed for traffic in a first lane of the link to a second representation of the turning speed for traffic in a second lane of the link. The apparatus also includes means for determining a speed ratio for the DBT intersection based upon the ratios that are determined for each of the plurality of time epochs and selecting one or more DBT intersections for DBT topology stranding based upon the speed ratio for the one or more DBT intersections.

In an example embodiment, the means for determining the representation of the turning speed includes means for determining an average turning speed in the downstream direction for traffic in each of the plurality of lanes of the link immediately upstream of the DBT intersection. In an example embodiment, the first and second representations of the turning speed comprise the highest and lowest average turning speeds, respectively, of the average turning speeds determined for the plurality of lanes of the link immediately upstream of the DBT intersection. In this example embodiment, the means for determining the ratio includes means for determining the ratio of the highest average turning speed to the lowest average turning speed for the plurality of lanes of the link immediately upstream of the DBT intersection. In this example embodiment, the means for determining the speed ratio includes means for determining an average of the ratios of the highest average turning speed to the lowest average turning speed for the plurality of lanes of the link immediately upstream of the DBT intersection for each of the plurality of time epochs.

In an example embodiment, the means for determining the representation of the turning speed bases the determination upon historical data regarding traffic in each of the plurality of lanes of the link immediately upstream of the DBT intersection for each of a plurality of time epochs. In an example embodiment, the apparatus also includes means for ranking the one or more DBT intersections based upon the speed ratio for the one or more DBT intersections prior to selecting the one or more DBT intersections.

BRIEF DESCRIPTION OF THE DRAWINGS

Figure 1:
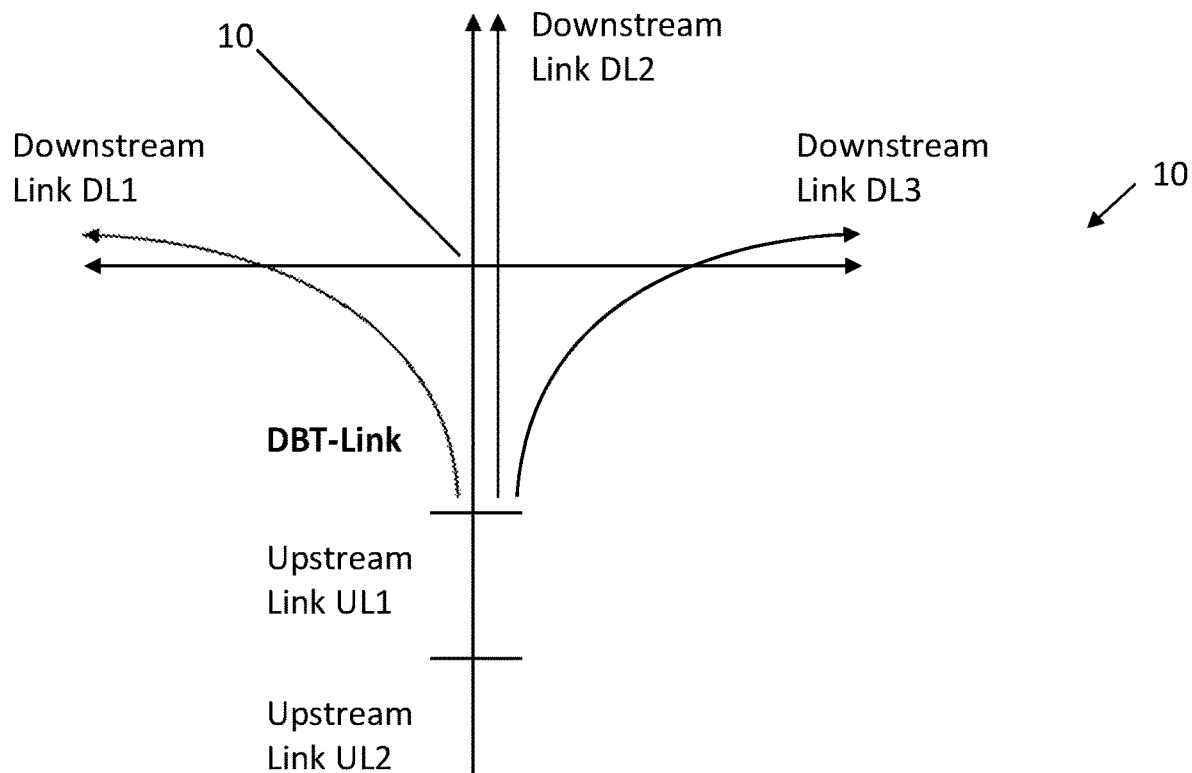
Figure 2:
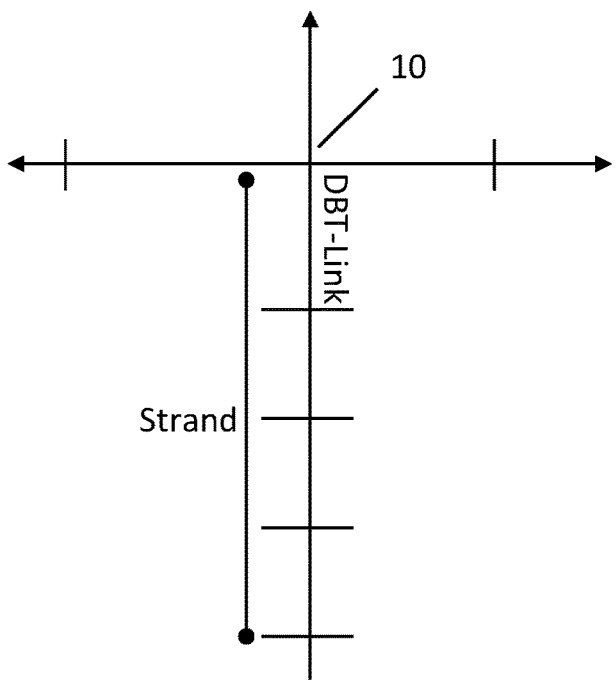
Figure 3:
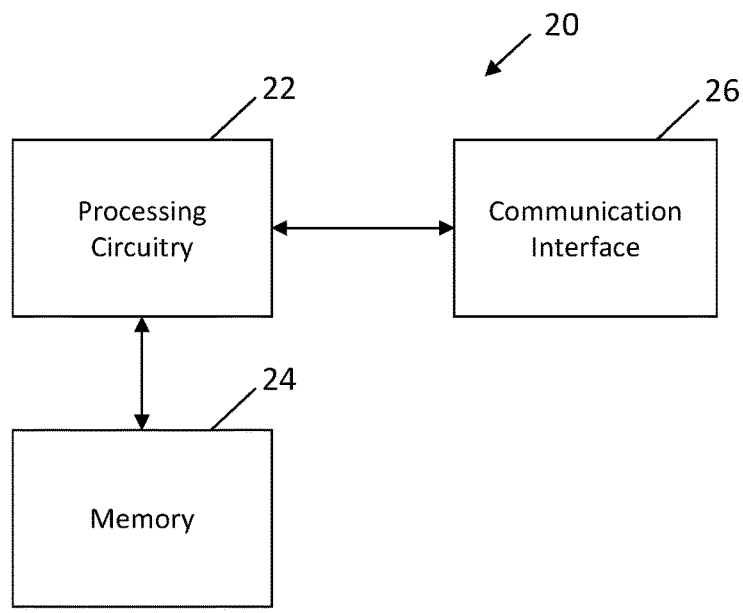
Figure 4:
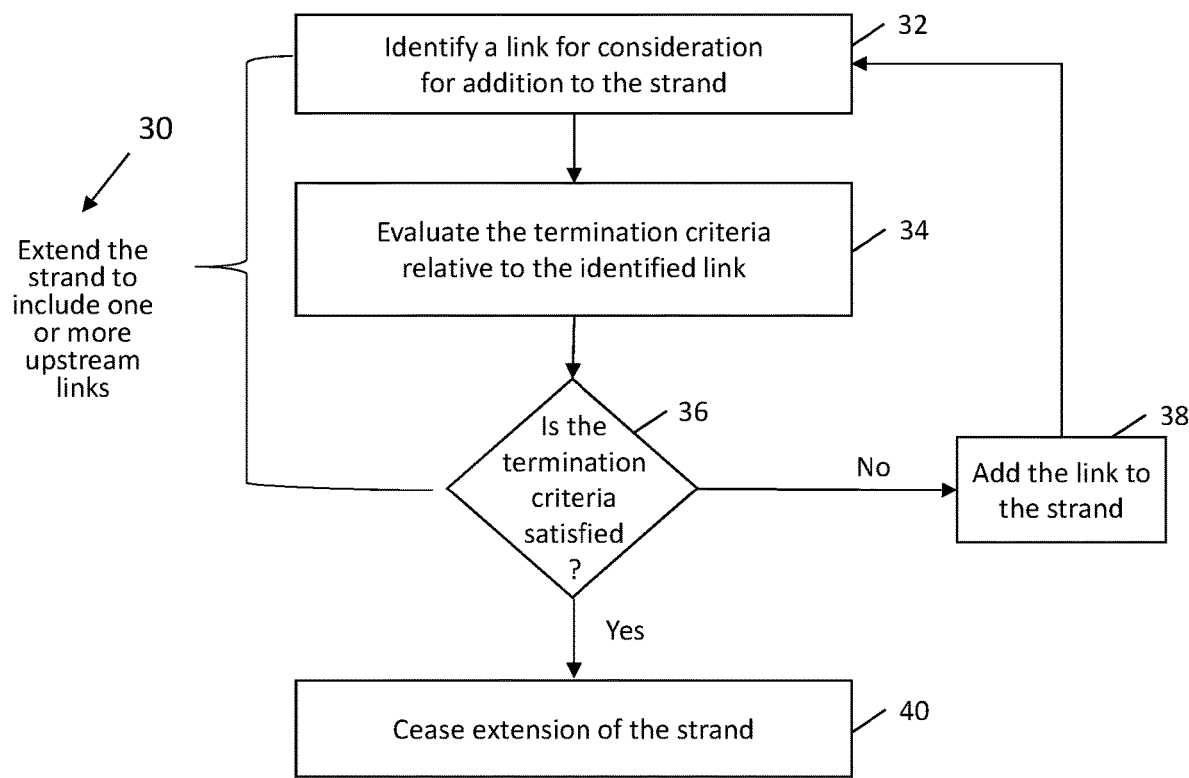
Figure 5:
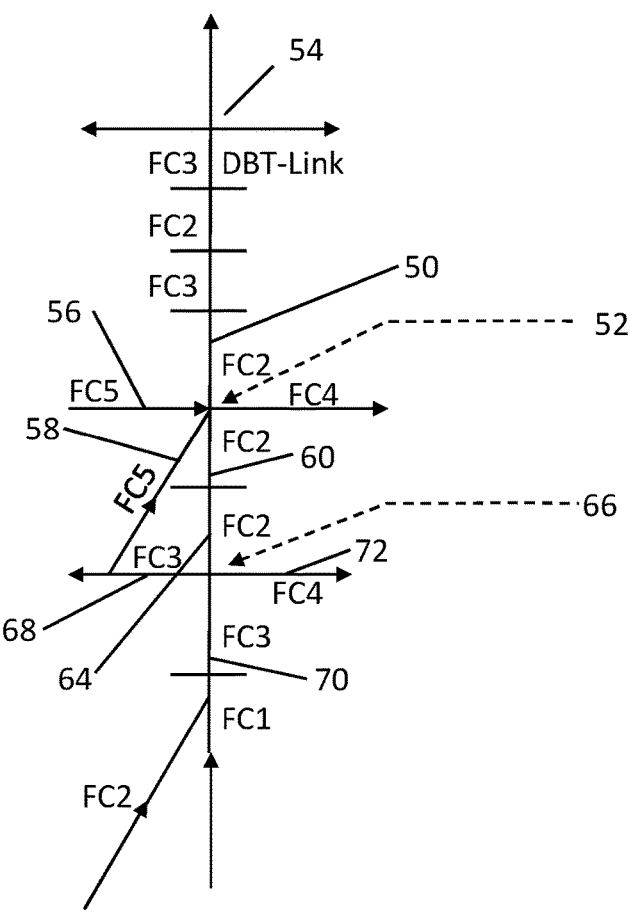
Figure 6:
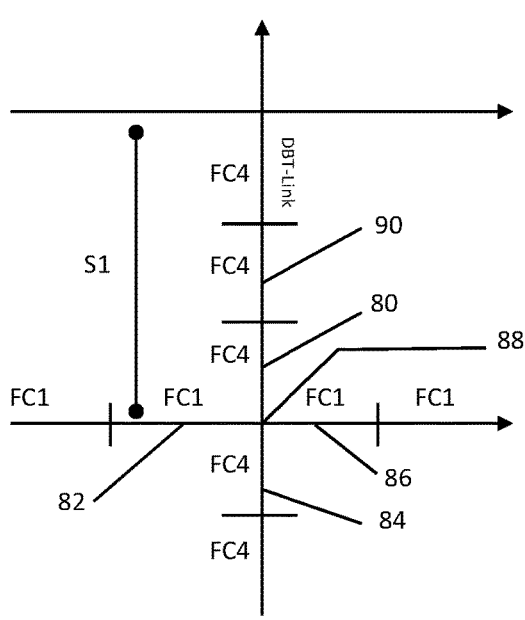
Figure 7:
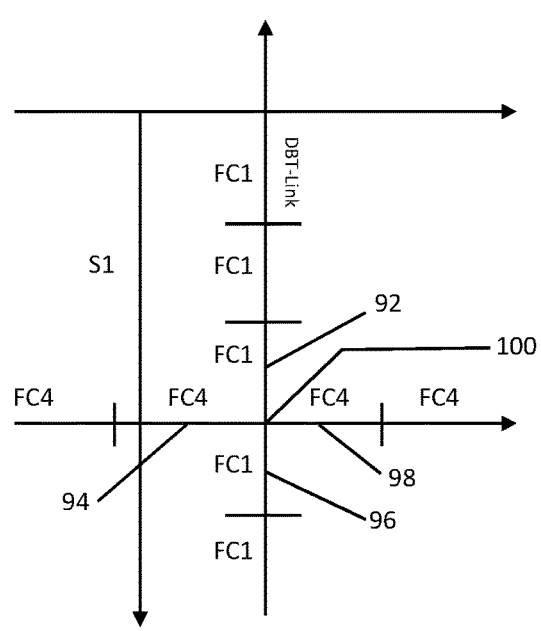
Figure 8:
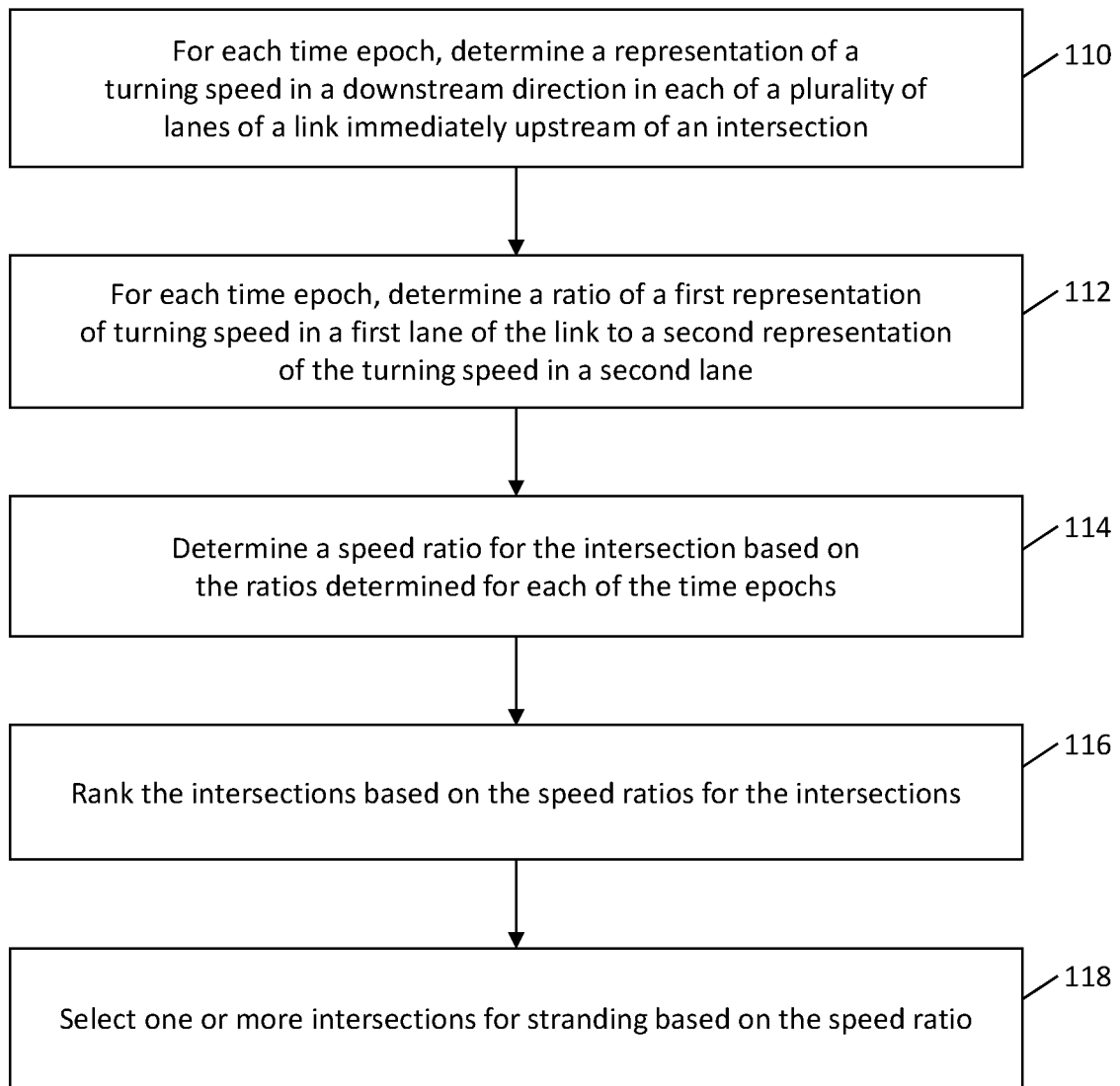

Having thus described certain embodiments of the invention in general terms, reference will now be made to the accompanying drawings, which are not necessarily drawn to scale, and wherein:

FIG. 1 is an illustration of a DBT link and an associated intersection as well as the three links downstream of the DBT link and two links upstream of the DBT link for which traffic may be affected by the traffic flow through the DBT link and the associated intersection;

FIG. 2 illustrates a DBT link and an associated intersection as well as a strand defined in accordance with an example embodiment of the present disclosure so as to include the DBT link and a plurality of upstream links;

FIG. 3 is a block diagram illustrating an apparatus that may be specifically configured to define a strand upstream of a DBT link in accordance with an example embodiment of the present disclosure;

FIG. 4 is a flow chart illustrating operations performed, such as by the apparatus of FIG. 3, in accordance with an example embodiment of the present disclosure in order to define a strand upstream of a DBT link;

FIG. 5 depicts a plurality of links upstream of a DBT link and illustrates the process of defining a strand upstream of the DBT link for links of various function classes in accordance with an example embodiment of the present disclosure;

FIG. 6 illustrates another example of the manner in which a strand upstream of a DBT link is defined in accordance with an example embodiment of the present disclosure by taking into account the function classes of the links;

FIG. 7 illustrates yet another example of the manner in which a strand upstream of a DBT link is defined in accordance with an example embodiment of the present disclosure by taking into account the function classes of the links; and FIG. 8 is a flow chart illustrating operations performed, such as by the apparatus of FIG. 3, in accordance with an example embodiment of the present disclosure in order to select one or more DBT intersections for DBT topology stranding.

DETAILED DESCRIPTION

Some embodiments of the present invention will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present invention. Thus, use of any such terms should not be taken to limit the spirit and scope of embodiments of the present invention.

A method, apparatus and computer program product are provided in accordance with an example embodiment in order to define a strand upstream of a DBT link. The strand generally includes one or more links upstream of the DBT link that are selected as a result of the possibility or probability of these upstream links having traffic on a lane-level that is affected, or most affected, by differences in the lane-level traffic flow along the DBT link and through the intersection. The one or more links upstream of the DBT link are generally consecutive links beginning with the DBT link such that the result strand includes the DBT link and one or more upstream links that define a consecutive sequence of links. By defining a strand in accordance with a method, apparatus and computer program product of an example embodiment, lane-level traffic information may be obtained for the one or more links that comprise the strand such that a navigation system, a routing system, a mapping system or the like may provide or take into account lane-level traffic information for vehicles approaching the intersection. In this regard, the collection and processing of the lane-level traffic information for the links of the strand may be prioritized relative to the collection and processing of lane-level traffic information for other links further removed from the intersection so as to provide the most meaningful lane-level traffic information to drivers and vehicles approaching the intersection while conserving or at least judiciously utilizing the computing resources by avoiding the consumption of the substantial computing resources required to collect and process even more lane-level traffic information for links further removed from the intersection that would generate lane-level traffic information that is of less use and less interest to a driver or a vehicle.

Referring now to FIG. 1, an intersection 10 is depicted. Although intersections may have any number of roads that cross one another or intersect in various configurations, the intersection that is illustrated is formed by two roads that cross in a substantially perpendicular orientation. For vehicles traveling toward the intersection in an upward direction relative to the orientation of the intersection of FIG. 1, the DBT link is the link immediately upstream of and adjacent to the intersection such that the DBT link is one of the links that enters into the intersection. In addition, the DBT link includes a plurality of lanes that are configured to permit traffic to flow in different directions through the intersection. In this illustrated embodiment, three links DL1, DL2 and DL3 are downstream of the DBT link and represent different routes taken by vehicles from the DBT link. For example, the DBT link of this example embodiment includes at least three lanes, the left most lane supporting vehicles turning left onto downstream link DL1, the right most lane supporting vehicles turning right onto downstream link DL3 and the center most lane(s) supporting vehicles traveling in a straight direction through the intersection and onto downstream DL2. The behavior of the vehicles, such as the average speed of the vehicles, in the different lanes of the DBT link may vary dramatically, but these variations may typically be taken into account by a routing system, navigation system, or the like as lane-level traffic information may be available for the DBT link.

As shown in FIG. 1, a plurality of links are also upstream of the DBT link as represented by upstream link UL1 and upstream link UL2. The traffic flow along at least some of the lanes of these upstream links may be affected by the traffic flow along the lanes of the DBT link and through the intersection 10 to the various downstream links. In accordance with an example embodiment, a strand is defined to extend upstream from the DBT link and to include one or more of the upstream links. In this regard, the one or more upstream links included in the strand along with the DBT link define a consecutive sequence of links that include at least some of the one or more links upstream of the DBT link for which lane-level traffic flow is affected by the lane-level traffic conditions of the DBT link. As shown in FIG. 2, for example, a strand S1 is defined so as to include the DBT link in a plurality of links upstream of the DBT link. As shown, the upstream links that are included in the strand are contiguous to one another and to the DBT link, thereby defining a consecutive sequence of links including one or more upstream links and the DBT link.

As shown in FIG. 3, an apparatus 20 is provided in accordance with an example embodiment in order to define the strand extending upstream from the DBT link. The apparatus of this example embodiment may be embodied by any of a wide variety of different computing devices including, for example, a server, a computer workstation, a personal computer, a desktop computer or any of a wide variety of mobile computing devices. Regardless of the type of computing device that embodies the apparatus, the apparatus of an example embodiment includes, is associated with or is in communication with processing circuitry 22, memory 24 and communication interface 26.

In some embodiments, the processing circuitry 22 (and/or co-processors or any other processors assisting or otherwise associated with the processing circuitry) may be in communication with the memory device 24 via a bus for passing information among components of the apparatus. The memory device may be non-transitory and may include, for example, one or more volatile and/or non-volatile memories. In other words, for example, the memory device may be an electronic storage device (for example, a computer readable storage medium) comprising gates configured to store data (for example, bits) that may be retrievable by a machine (for example, a computing device like the processor). The memory device may be configured to store information, data, content, applications, instructions, or the like for enabling the apparatus to carry out various functions in accordance with an example embodiment of the present invention. For example, the memory device could be configured to buffer input data for processing by the processor. Additionally or alternatively, the memory device could be configured to store instructions for execution by the processing circuitry.

The processing circuitry 22 may be embodied in a number of different ways. For example, the processing circuitry may be embodied as one or more of various hardware processing means such as a processor, a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processing circuitry may include one or more processing cores configured to perform independently. A multi-core processor may enable multiprocessing within a single physical package. Additionally or alternatively, the processing circuitry may include one or more processors configured in tandem via the bus to enable independent execution of instructions, pipelining and/or multithreading.

In an example embodiment, the processing circuitry 22 may be configured to execute instructions stored in the memory device 24 or otherwise accessible to the processing circuitry. Alternatively or additionally, the processing circuitry may be configured to execute hard coded functionality. As such, whether configured by hardware or software methods, or by a combination thereof, the processing circuitry may represent an entity (for example, physically embodied in circuitry) capable of performing operations according to an embodiment of the present invention while configured accordingly. Thus, for example, when the processing circuitry is embodied as an ASIC, FPGA or the like, the processing circuitry may be specifically configured hardware for conducting the operations described herein. Alternatively, as another example, when the processing circuitry is embodied as an executor of software instructions, the instructions may specifically configure the processing circuitry to perform the algorithms and/or operations described herein when the instructions are executed. However, in some cases, the processing circuitry may be a processor of a specific device (for example, a computing device) configured to employ an embodiment of the present invention by further configuration of the processor by instructions for performing the algorithms and/or operations described herein. The processing circuitry may include, among other things, a clock, an arithmetic logic unit (ALU) and logic gates configured to support operation of the processing circuitry.

The apparatus 20 of an example embodiment may also optionally include a communication interface 26 that may be any means such as a device or circuitry embodied in either hardware or a combination of hardware and software that is configured to receive and/or transmit data from/to other electronic devices in communication with the apparatus, such as a navigation system 20 or other consumer of map data. Additionally or alternatively, the communication interface may be configured to communicate in accordance with various wireless protocols including Global System for Mobile Communications (GSM), such as but not limited to Long Term Evolution (LTE). In this regard, the communication interface may include, for example, an antenna (or multiple antennas) and supporting hardware and/or software for enabling communications with a wireless communication network. Additionally or alternatively, the communication interface may include the circuitry for interacting with the antenna(s) to cause transmission of signals via the antenna(s) or to handle receipt of signals received via the antenna(s).

Referring now to FIG. 4, the operations performed, such as by the apparatus 20 of FIG. 3, in accordance with an example embodiment are illustrated. As shown at 30 of FIG. 3, the apparatus includes means, such as the processing circuitry 22 or the like, configured to extend the strand so as to include one or more links upstream of the DBT link associated with a respective intersection. As described below, the strand includes the DBT link and is extended, typically one link at a time, in an upstream direction commencing with the link immediately adjacent to and upstream of the DBT link. For each link that is considered for inclusion within the strand and prior to the inclusion of the link in the strand, a determination is made as to whether the link should be added to the strand. As shown in blocks 32 and 34, the apparatus of an example embodiment includes means, such as the processing circuitry or the like, configured to identify the link to be considered for addition to the strand, as well as means, such as the processing circuitry or the like, configured to evaluate the termination criteria relative to the link that is undergoing consideration for addition to the strand. As shown by decision block 36 of FIG. 3, the apparatus of this example embodiment includes means, such as the processing circuitry or the like, configured to determine whether the link is to be added to the strand based upon an evaluation of a termination criteria. In an instance in which the termination criteria is not satisfied, the apparatus includes means, such as the processing circuitry or the like, configured to add the link to the strand. See block 38. Another link, such as the next successive link in an upstream direction, is then identified and evaluated in the same manner with respect to its possible addition to the strand. This process repeats until the termination criteria is satisfied. In an instance in which the termination criteria is satisfied, the apparatus includes means, such as the processing circuitry or the like, for ceasing further extension of the strand. See block 40. The strand is then defined as the DBT link and the one or more upstream links that have been added to the strand, an example of which is shown in FIG. 2.

The termination criteria may be based upon one or more factors with at least one of the factors being based upon function classes of the links associated with, such as by being immediately adjacent, an intersection, that is, an intersection upstream of a DBT link. The function class of a road defines the size of road. In the United States, function classes FC1, FC2, FC3, FC4 and FC5 are defined with the lower function classes being representative of larger roads and the larger function classes being representative of smaller. For example, a highway is designated as function class 1, while an arterial road is designated as function class 5.

In this example embodiment, the termination criteria is based upon the relationship of a function class of the link that is being considered for addition to the strand to the function class of one or more other links, such as one or more other links that are upstream of the link that is under consideration for addition to the strand and which, in combination with the link that is under consideration for addition to the strand, are immediately adjacent an intersection. In this regard, in an instance in which the link that is under consideration for addition to the strand is associated with an intersection that is upstream of the DBT link, such as by being immediately adjacent the upstream intersection and, more particularly, immediately downstream of the upstream intersection, the termination criteria is at least partially based upon the relationship of the function class of the link that is under consideration for addition to the strand to the function class of the one or more other links that are also immediately adjacent the upstream intersection (and, as a result, also upstream of the link that is under consideration for addition to the strand).

The termination criteria of this example embodiment may be at least partially based upon a difference in the function class of the link that is under consideration for addition to the strand and the function class of the one or more other links associated with the upstream intersection. In this example embodiment, the difference in the function class may be separately defined between the link that is under consideration for addition to the strand and each of the one or more other links associated with the upstream intersection. In an example embodiment in which the link that is considered for addition to the strand has a function class $FC_X$ and one of the other links associated with the upstream intersection has a function class $FC_Y$, the difference between the function class of the link considered for addition to the strand and the other link associated with the upstream intersection may be defined as $FC_X$–$FC_Y$. By separately determining this difference in function class between the link that is under consideration for addition to the strand and each of the other links associated with the upstream intersection, a number of difference values equal to the number of other links associated with the upstream intersection may be defined.

In this example embodiment, the termination criteria may be at least partially based upon the difference between the function class of the link under consideration and the function class of at least a predetermined number of the one or more other links associated with the upstream intersection by at least a predefined amount. For example, the termination criteria may be defined so as to be satisfied in an instance in which the function class of the link under consideration for addition to the strand differs from the function class of zero or two or more of the other links associated with the upstream intersection by a difference that is greater than –2.

By way of example and with reference to FIG. 5, the strand is extended upstream from the DBT link (with the upstream link(s) that are not associated with an intersection (such as not being immediately adjacent an intersection) being evaluated pursuant to and, in this embodiment, satisfying one or more other parameters of the termination criteria that are described below) until link 50 that is associated with an intersection 52 that is upstream of the DBT link (and upstream of the intersection 54 with which the DBT link is associated) is evaluated for consideration for addition to the strand. As link 50 is associated with an upstream intersection 52, such as by being immediately adjacent the upstream intersection, the termination criteria that is considered in conjunction with the potential addition of link 50 to the strand is based at least partially upon the relationship of the function classes of link 50 to the other links 56, 58, 60, 62 associated with, e.g., immediately adjacent to, the upstream intersection.

In this example embodiment, the differences between the function class FC2 associated with the link 50 that is under consideration for addition to the strand and the function classes of the other links 56, 57, 60, 62 adjacent the upstream intersection 52 are considered. In this regard, four other links are immediately adjacent to the intersection and the differences between the function class FC2 for link 100 and the function class of each of the other links are defined as follows:

For link 56: 2−5=−3,
For link 58: 2−5=−3,
For link 60: 2−2=0, and
For link 62: 2−4=−2.

In this example embodiment in which the termination criteria requires that the function class of the link 50 under consideration for addition to the strand differs from the function class of zero or two or more of the other links 56 58, 60, 62 associated with the upstream intersection 52 by a difference that is greater than −2, the foregoing differences in function class fail to satisfy the termination criteria. In this example, of the resulting differences in the function classes of the links, only one of the differences, that is, the difference of 0 with respect to link 60, is greater than the predefined difference amount of −2 such that the termination criteria is not satisfied and link 50 is added to the strand.

As a result, links are again added to the strand in an upstream direction (with the upstream link(s) that are not associated with an intersection (such as not being immediately adjacent an intersection) being evaluated pursuant to and, in this embodiment, satisfying one or more other parameters of the termination criteria that are described below) until link 64 is considered for addition to the strand. Since link 64 is again adjacent to, such as by being immediately downstream of, an intersection 66 that is upstream of the intersection 54 associated with the DBT link, link 64 will be evaluated pursuant to a termination criteria that takes into account the function classes of the other links 68, 70, 72 associated with the upstream intersection 66. In order to evaluate the termination criteria of this example embodiment, the differences between the function class of the link 64 that is under consideration for addition to the strand and the function classes of the other links 68, 70, 72 adjacent the upstream intersection 66 are evaluated in a comparable manner to that described above with respect to link 50.

With respect to link 64, the differences between the function class FC2 associated with the link that is under consideration for addition to the strand and the function classes of the other links 68, 70, 72 adjacent the upstream intersection 66 are considered. In this regard, three other links are immediately adjacent to the intersection and the differences between the function class FC2 for link 64 and the function class of each of the other links 68, 70, 72 are defined as follows:

For link 68: 2−3=−1,
For link 70: 2−3=−1, and
For link 72: 2−4=−2.

In this example embodiment in which the termination criteria requires that the function class of the link 64 under consideration for addition to the strand differs from the function class of zero or two or more of the other links 68, 70, 72 associated with the upstream intersection 66 by a difference that is greater than −2, the foregoing differences in function class satisfy the termination criteria. In this example, of the resulting differences in the function classes of the links, two of the differences, that is, the differences of −1 with respect to links 68 and 70, are greater than the predefined difference amount of −2 such that the termination criteria is satisfied. As such, the addition of links to the strand is ceased and the strand is not further extended. As a result, the resulting stream includes the DBT link as well as links upstream of the DBT link up to, but not including link 62.

Other examples of upstream intersection are depicted in FIGS. 6 and 7 with the link that is immediately downstream of the upstream intersection being evaluated for inclusion in the strand based upon a termination criteria that takes into account differences in the function classes of the links. With respect to link 80 of FIG. 6, the differences between the function class FC4 associated with the link that is under consideration for addition to the strand and the function classes of the other links 82, 84, 86 adjacent the upstream intersection 88 are considered. In this regard, three other links are immediately adjacent to the intersection and the differences between the function class FC4 for link 80 and the function class of each of the other links are defined as follows:

For link 82: 4−1=3,
For link 84: 4−4=0, and
For link 86: 4−1=3.

In this example embodiment in which the termination criteria requires that the function class of the link 80 under consideration for addition to the strand differs from the function class of zero or two or more of the other links associated with the upstream intersection by a difference that is greater than −2, the foregoing differences in function class satisfy the termination criteria. In this example, of the resulting differences in the function classes of the links, all three of the differences are greater than the predefined difference amount of −2 such that the termination criteria is satisfied. As such, the addition of links to the strand is ceased and the strand is not further extended. As a result, the resulting stream includes only the DBT link as well as upstream link 90.

Additionally, with respect to link 92 of FIG. 7, the differences between the function class FC1 associated with the link that is under consideration for addition to the strand and the function classes of the other links 94, 96, 98 adjacent the upstream intersection 100 are considered. In this regard, three other links are immediately adjacent to the intersection and the differences between the function class FC1 for link 92 and the function class of each of the other links are defined as follows:

For link 94: 1−4=−3,
For link 96: 1−1=0, and
For link 98: 1−4=−3.

In this example embodiment in which the termination criteria requires that the function class of the link 92 under consideration for addition to the strand differs from the function class of zero or two or more of the other links associated with the upstream intersection by a difference that is greater than −2, the foregoing differences in function class fail to satisfy the termination criteria. In this example, of the resulting differences in the function classes of the links, only one of the differences is greater than the predefined difference amount of −2 such that the termination criteria is not satisfied. As such, link 92 is added to the strand and the extension of the strand continues beyond the upstream intersection with the consideration of another link for addition to the strand.

In the foregoing embodiments in which the termination criteria is based upon a relationship of the function classes of the links adjacent an intersection that is upstream of the DBT link, the apparatus 20 of an example embodiment is selective in terms of which one of the other links upstream of and adjacent the intersection is to be next considered for addition to the strand in an instance in which the termination criteria is not satisfied in relation to the evaluation of the link immediately downstream of the intersection. In this regard, in an instance in which the termination criteria is not satisfied, the apparatus of an example embodiment includes means, such as the processing circuitry 22 or the like, configured to extend the strand through the intersection, that is, the intersection upstream of the intersection associated with the DBT link, to another link selected from among the one or more other links associated with, that is, adjacent to and upstream of, the upstream intersection based upon the function class of the another link relative to the function class(es) of the one or more other link(s) associated with the upstream intersection. In an example embodiment, the another link that is selected for consideration of addition to the strand has the smallest function class from among the one or more other links associated with the upstream intersection. By selecting the link to be considered for addition to the strand as the link having the smallest of the function classes, the link is selected that is the largest road and therefore has the greatest bandwidth and correspondingly the greatest impact upon traffic flow including lanes of traffic that will most likely suffer the greatest effects from differences in the lane level traffic behavior in the DBT link and through the intersection with which the DBT link is associated. In an instance in which the smallest function class is shared by two or more links associated with the upstream intersection, however, the apparatus, such as the processing circuitry, of an example embodiment is configured to discontinue further additions to the strand.

By way of example, intersection 52 of FIG. 5 includes five links associated therewith. Upon determining that the termination criteria is not satisfied during consideration of link 50 for addition to the strand, link 52 is added to the strand and the link having the smallest function class from among the function classes of the other links adjacent the upstream intersection 52 is identified for consideration for addition to the strand. As such, in the example of FIG. 5, link 60 is selected for consideration for addition to the strand since the function class FC2 of link 60 is the smallest of the function classes for the other links adjacent the upstream intersection 52. Similarly, the intersection 100 of FIG. 7 includes four links associated therewith. Upon determining that the termination criteria is not satisfied during consideration of link 92 for addition to the strand, link 92 is added to the strand and the link having the smallest function class from among the function classes of the other links adjacent the upstream intersection is identified for consideration for addition to the strand. As such, in the example of FIG. 7, link 96 is selected for consideration for addition to the strand since the function class FC1 of link 96 is the smallest of the function classes for the other links adjacent the upstream intersection.

Although the termination criteria of some embodiments is based solely on the relationship of the function class of the link under consideration for addition to the strand to the function class of one or more other links, the termination criteria of other embodiments may also be based upon one or more additional factors in addition to the relationship of the function classes. For example, the termination criteria may also be based on the length of the strand. In this regard, a predefined maximum length of the strand, such as 500 meters, may be defined and the apparatus 20 may include means, such as the processing circuitry 22 or the like, for determining whether a link that is under consideration for addition to the strand would cause the resulting length of the strand (after having added the link under consideration), to exceed the predefined maximum length and, if so, to find the termination criteria to be satisfied and to cease further extension of the strand, thereby effectively limiting the length of the resulting strand.

In an example embodiment, the termination criteria is, additionally or alternatively, based on whether a link that is considered for addition to a strand is associated with a stop sign or stop light, that is, whether the link has a stop sign or stop light along the link. In an instance in which the link is not associated with a stop sign or stop light, the apparatus 20, such as the processing circuitry 22, of this example embodiment is configured to extend the strand so as to include the additional link so long as the termination criteria is otherwise satisfied, such as so long as other parameters considered in conjunction with the termination criteria are also satisfied. However, in an instance in which the link that is considered for addition to the strand is associated with a stop sign or stop light, the apparatus, such as the processing circuitry, of this example embodiment is configured to determine that the termination criteria is satisfied and that the link should not be added to the strand, thereby ceasing further extension of the strand.

In another example embodiment, the apparatus 20, such as the processing circuitry 22, is configured to consider traffic information for intersections upstream of the intersection with which the DBT link is associated. In an instance in which the apparatus, such as the processing circuitry, is evaluating a link that is associated with, that is, that is immediately adjacent to, e.g., immediately downstream of, an intersection that is upstream of the intersection at which the DBT link is associated, and the traffic information associated with the link that is under consideration for addition to the strand indicates that traffic experiences little change during free flow across the upstream intersection, that is, traffic experiences a change in speed of less than a predefined threshold, the apparatus, such as the processing circuitry, of this example embodiment is configured to determine that the termination criteria with respect to the traffic information associated with an upstream intersection is not satisfied such that the link that is under consideration may be added to the strand so long as the other termination criteria are satisfied. However, in an instance in which the traffic information associated with the upstream intersection indicates that the traffic crossing the intersection during free flow experiences a greater variation, such as a change in speed greater than the predefined threshold, the apparatus, such as the processing circuitry, of this example embodiment is configured to determine that the termination criteria is not satisfied such that the link that is under consideration is not added to the strand and the extension of the strand is ceased.

Although various examples of termination criteria are provided in the foregoing embodiments, these termination criteria may be combined in any combination with the termination criteria including one, two or all of the foregoing examples of termination criteria. Additionally, the termination criteria may vary depending upon the type of link that is considered for addition to the strand. For example, the termination criteria that is utilized in conjunction with the consideration of a link adjacent to, e.g., immediately downstream of, an intersection that is upstream of the DBT link may consider the differences in the function classes of the links adjacent to the upstream intersection and/or changes in the free flow across the upstream intersection either in addition to or instead of the maximum length of the strand and/or whether the link has a stop sign or stop light associated therewith. However, the termination criteria of this example that is utilized in consideration with a link for addition to the strand that is not adjacent to an upstream intersection does not consider the differences in the function classes of the links adjacent to the upstream intersection and does not consider changes in the free flow across the upstream intersection, but instead considers the maximum length of the strand and/or whether the link has a stop sign or stop light associated therewith. In addition, the termination criteria may include different or alternative termination criteria in other example embodiments.

The apparatus 20, such as the processing circuitry 22, of the foregoing example embodiments have considered links upstream of a DBT link in conjunction with the extension of the strand. As depicted in FIGS. 5, 6 and 7, the links that are determined to be upstream of a DBT link and that are considered for addition to a strand may be based upon the network topology, such as determined from the map data stored by the memory 24 or otherwise accessible by the processing circuitry, such as via the communications interface 26. In this regard, the map data may define the sequence of links upstream of a DBT link and provide information associated with the links, such as the function class of a link, whether a stop light or stop sign is associated with the link, the length of the link, and any intersection with which the link is associated, such as by being immediately adjacent.

The map data may be stored by a database accessible by the processing circuitry 22, such as via the communication interface 26. The map data may include the information necessary to define a map of the roads and other features, at least in a certain region. In this regard, the map data may include various attributes of the road segments. The map data may also be representative of sidewalks or other types of pedestrian segments, as well as open areas, such as grassy regions or plazas.

In an example embodiment, the map data may include node data, road segment data or link data, point of interest (POI) data or the like in addition to traffic data as described below. The database may also include cartographic data, routing data, and/or maneuvering data. According to some example embodiments, the road segment data records may be links or segments representing roads, streets, or paths, as may be used in calculating a route or recorded route information for determination of one or more personalized routes. The node data may be end points corresponding to the respective links or segments of road segment data. The road link data and the node data may represent a road network, such as used by vehicles, cars, trucks, buses, motorcycles, and/or other entities. Optionally, the database may contain path segment and node data records or other data that may represent bicycle lanes, pedestrian paths or areas in addition to or instead of the vehicle road record data, for example. The road/link segments and nodes can be associated with attributes, such as geographic coordinates, street names, address ranges, speed limits, turn restrictions at intersections, and other navigation related attributes, as well as POIs, such as fueling stations, hotels, restaurants, museums, stadiums, offices, auto repair shops, buildings, stores, parks, etc. The database can include data about the POIs and their respective locations in the POI records. The database may include data about places, such as cities, towns, or other communities, and other geographic features such as bodies of water, mountain ranges, etc. Such place or feature data can be part of the POI data or can be associated with POIs or POI data records (such as a data point used for displaying or representing a position of a city). In addition, the map database can include event data (e.g., traffic incidents, construction activities, scheduled events, unscheduled events, etc.) associated with the POI data records or other records of the map database.

In an alternative embodiment, however, the apparatus 20, such as the processing circuitry 22, is configured to determine the links that are upstream of the DBT link and which should therefore be considered in conjunction with the extension of the strand based upon probe traces that originate from upstream of the DBT link and that extend through the DBT link. In this regard, probe traces may be defined based upon probe data collected by probe devices and stored, for example, by a database accessible to the processing circuitry 22, such as via the communications interface 26. In this regard, any of a variety of devices may serve as a probe device, such as a mobile device, e.g., a smartphone, a tablet computer, a personal digital assistant (PDA), a personal navigation device (PND), or the like, an in-vehicle navigation system, a vehicle control system, an ADAS or the like, that provides samples of probe data regarding, for example, the location of a vehicle as the vehicle proceeds along a road. The probe data may include not only the location of the vehicle as may be defined by a global positioning system (GPS) associated with the probe, and the time at which the vehicle is at the location, but also the speed, the heading and other parameters that define the current behavior of the vehicle. Based upon the location, the probe data may be map matched to a link and, in some embodiments, to a lane of a link, such as by a map matching technique. The probe data may also include an identifier, such as a trajectory identifier, that identifies the probe that provides the probe data and enables the linking of instances of probe data into vehicle trajectories and probe traces while still, in some embodiments, maintaining the anonymity of the probe device and/or a vehicle that the probe device is onboard. Thus, probe traces define the path of a probe device, such as may be carried by a vehicle during its travel along a portion of the road network.

In this example embodiment, the apparatus 20, such as the processing circuitry 22, is configured to consider the plurality of probe traces for which the last link of the probe trace is the DBT link. From among the plurality of probe traces, the apparatus, such as the processing circuitry, of this example embodiment, is configured to identify the longest probe trace in each direction, such as probe traces that extend along different paths through intersections that are upstream of the DBT link. In this regard, the length of a probe trace is defined by the aggregate lengths of the links that comprise the probe trace. Once the longest probe trace along each direction has been identified, the apparatus, such as the processing circuitry, of this example embodiment is configured to evaluate the links through which the longest probe trace in one of the directions passes. As described above, the apparatus, such as the processing circuitry, is configured to sequentially evaluate the links one at a time from the DBT link in an upstream direction so as to determine whether the termination criteria is satisfied or not. In an instance in which the termination criteria is satisfied, the length of the link under evaluation is not added to the strand and the extension of the strand is ceased. However, if the termination criteria is not satisfied, the apparatus, such as the processing circuitry, is configured to add the link to the strand and to consider the next upstream link along the probe trace under evaluation for possible addition to the strand. The apparatus, such as the processing circuitry, of this example embodiment repeats this process to determine the length of the strand along the longest probe trace in each direction.

As described above, the apparatus 20, such as the processing circuitry 22 or the like, is configured to determine a strand of one or more links upstream of a DBT link associated with an intersection. The strand is determined such that the links that form the strand upstream of the DBT link are likely to and, in some embodiments, do have the greatest probability of being impacted by variations in the lane-level traffic flow along the DBT link and through the intersection associated with the DBT link, such as by having a speed of travel that increases or decreases in a manner that mirrors or is at least related to corresponding changes in the speed of travel along the various lanes of the DBT link and through the intersection with which the DBT link is associated. As such, the collection and analysis of lane level traffic information associated with the links of the strand may be prioritized relative to the collection and processing of lane level traffic information associated with other links that are not similarly impacted by the lane level traffic flow along a DBT link and through an intersection with which a DBT link is associated. By prioritizing the collection and processing of the lane level traffic information of the links of the strand, traffic information may be provided to drivers, such as via navigation or mapping systems utilized by drivers, or vehicles, such as the navigation or other control systems employed by autonomous or semi-autonomous vehicles, regarding the lane level traffic conditions of these links.

In this regard, the routes that are defined may take into account the lane level traffic information of the links of a strand and the estimated time to travel from an origin to a destination including an estimated time of arrival may take into account the lane level traffic information. As such, routes may be defined that do not include links along the strand during those times of day and days of the week in which the lane level traffic information indicates that the traffic flow is much slower than normal along the links, but may define a route that extends along the links of the strand during other times of day and days of the week in which the lane level traffic information indicates that traffic flow is proceeding at a reasonable pace. The route that is defined may also provide lane level guidance to a driver or a vehicle indicating the lane of a link in which the vehicle should travel, such as to avoid congested traffic in a link of a strand, such as due to traffic backing up from the intersection with which the DBT link is associated, e.g., traffic backing up in the left lane of a two-lane road due to delays associated with a left turn lane of a DBT link. Additionally and alternatively, the collection and processing of lane level traffic information associated with the links of the strand may permit warnings or other messages regarding lane level traffic conditions, such as warnings or messages of delays associated with one or more lanes of the links of the strand, thereby permitting a driver or a vehicle to safely navigate the links of a strand upstream of a DBT link and/or to change lanes in a safe manner to alleviate issues caused by congestion in a lane of a link of a strand.

By prioritizing the collection and processing of lane level traffic information to those links along the strand upstream of the DBT link, the processing intensive activities associated with the lane level traffic information may be conducted for those links that are considered most likely to be affected by changes in lane level traffic flow through a DBT link and an intersection associated with a DBT link, but may conserve the processing resources that otherwise would be consumed to similarly collect and process lane level traffic information for many other links of a road network that are not similarly part of a strand upstream of the DBT link since these other links are not considered to be as likely to have appreciable variations in lane level traffic attributable to traffic flow through a downstream intersection. Thus, the method, apparatus 20 and computer program product of the example embodiment provide a technical advantage in that the computing resources are allocated to the processing of lane level traffic information for those links, such as the links along a strand, that are considered to be most likely to be impacted by traffic flow through the intersection.

The method, apparatus 20 and computer program product of an example embodiment may consider each DBT link associated with each intersection in conjunction with the generation of a strand upstream of the respective DBT links. However, in some embodiments, a method, apparatus and computer program product are provided in order to select a subset of the DBT links for evaluation in relation to the generation of a strand upstream of the respective DBT links of the selected subset, again in order to conserve processing resources and to do so in a judicious manner. In order to select the DBT links that will be considered in relation to the generation of a strand, the method, apparatus and computer program product of an example embodiment are configured to determine and evaluate a ranking metric for each or at least a plurality of DBT links and to identify the DBT links to be evaluated for purposes of the generation of a strand based upon the ranking metric. In an example embodiment and as described below, the ranking metric may be based upon variations in the speed of travel between different lanes of the DBT link with those DBT links having the greatest differences in the speed of travel between the lanes of the DBT link being ranked more greatly for purposes of the potential generation of a strand than those DBT links for which the differences in speed between the lanes are smaller.

The ranking metric may be based upon historical traffic information, including historical lane level traffic information, associated with the plurality of intersections, including the DBT links immediately upstream of the plurality of intersections. The historical traffic information may be stored by a database accessible by the processing circuitry 22, such as via the communications interface 26. Among other things, the historical lane level traffic information includes a representation of the speed of travel along a respective lane of a link, such as a segment of a road. The representation of the speed of travel along a respective lane of a link may be the average speed of travel along the respective link or some other representation of the speed of travel.

As the speed of travel along a respective lane of a link may vary over the course of time, the historical lane level traffic information may include historical lane level traffic information for each of a plurality of time epochs during a week. In this regard, a week may be divided into a plurality of time epochs, such as a plurality of fifteen minute segments, that in combination represent the entire week. In this example embodiment, the historical lane level traffic information may include a representation of the speed of travel along a respective lane of a link during each time epoch of a week. For example, the historical lane level traffic information may include the average speed of travel along a respective lane of a link between 7:45 a.m. and 8:00 a.m. on a Monday, the average speed of travel along the same respective lane of the link between 9:00 p.m. and 9:15 p.m. on a Saturday evening and the average speed of travel along the same respective lane of the link during every other time epoch of the week.

As shown in FIG. 8, the apparatus 20 of this example embodiment includes means, such as the processing circuitry 22 or the like, for determining, for each of a plurality of time epochs for a respective a link, such as a DBT link having a plurality of lanes and located adjacent to and immediately upstream of an intersection, a representation of the turning speed in a downstream direction for traffic in each of a plurality of lanes of the link including, for example, left turns, right turns, U-turns and proceeding in a straight direction without a turn. See block 110. The representation of the turning speed may be provided in various manners, such as an average turning speed for a respective time epoch for the respective lane of the link.

The apparatus 20 of this example embodiment also includes means, such as the processing circuitry 22 or the like, for determining, for each of the plurality of time epochs for the respective lanes of a link, a ratio of a first representation of the turning speed for traffic in a first lane of the link to a second representation of the turning speed for traffic in a second lane of the link during a respective time epoch. See block 112 of FIG. 8. In an example embodiment, the first and second representations of the turning speed are the highest and lowest turning speeds, respectively, of the turning speeds that are determined for the plurality of lanes of the link during a respective time epoch. In an example embodiment in which the representation of the turning speed of a lane is the average turning speed in the downstream direction for traffic in the respective lane of the link, e.g., the DBT link, the first and second representations of the turning speed of this example embodiment are the highest and lowest average turning speeds, respectively, of the average turning speeds determined for the plurality of lanes of the link during a respective time epoch. By way of example, in a respective time epoch, the average turning speed may be determined for each of a plurality of lanes of a DBT link. From among the average turning speeds for the plurality of lanes, the highest and lowest average speeds are determined and the ratio thereof is, in turn, determined. For example, the apparatus, such as the processing circuitry, is configured to determine the ratio between the first and second representations of the turning speed for traffic in the first and second lanes, respectively, of the link by dividing the first representation of the turning speed, such as the highest average turning speed for a lane of the link, by the second representation of the turning speed, such as the lowest average turning speed for a lane of the link, during the same time epoch. The apparatus, such as the processing circuitry, repeats this determination of a ratio of representations of the turning speed in different lanes of a link for each of a plurality of time epochs, such as for each of the time epochs.

In an example embodiment, the apparatus 20 includes means, such as the processing circuitry 22 or the like, configured to determine a ranking metric, such as a speed ratio, for the intersection based upon the ratios that are determined for each of the plurality of time epochs. In an example embodiment, the apparatus, such as the processing circuitry, is configured to determine the speed ratio for an intersection by determining the average of the ratios of the first representation of the turning speed for traffic in a first lane of the link associated with the intersection, such as by being immediately upstream of the intersection, to the second representation of the turning speed for traffic in the second lane of the link for each respective time epoch across all of the time epochs of a period of time, such as a week. See block 114 of FIG. 8. In an example in which the average turning speed is utilized as a representation of the turning speed, the apparatus, such as the processing circuitry, is configured to determine the speed ratio by determining an average of the ratios of the highest average turning speed to the lowest average turning speed for the plurality of lanes of the link, e.g., a DBT link, for each of the plurality of time epochs within a period of time, such as a week. As a result of this determination, the greater the speed ratio, the greater the variation in turning speeds between the lanes for the link throughout the period of time and/or the more often that the lanes of the link will experience variations in turning speeds therebetween. Conversely, the smaller the speed ratio, the smaller the variation in turning speeds between the lanes for the link throughout the period of time and/or the less often that the lanes of the link will experience variations in turning speeds therebetween.

The apparatus 20 of this example embodiment also includes means, such as the processing circuitry 22 or the like, configured to select one or more intersections for topology stranding, that is, for the generation of corresponding strands, based upon the ranking metric, such as the speed ratio, of the one or more intersections. See block 118 of FIG. 8. In an example embodiment, the one or more intersections are DBT intersections having a DBT link immediately upstream thereof with the one or more DBT intersections being selected for DBT topology stranding. In this regard, the apparatus of an example embodiment includes means, such as the processing circuitry or the like, configured to rank the one or more intersections based upon the speed ratio of the one or more intersections, such as from the greatest speed ratio to the smallest speed ration, prior to selecting the one or more intersections for the generation of corresponding strands. See block 116. For example, the apparatus, such as the processing circuitry, may be configured to select a predefined number or a predefined percentage of intersections having the greatest speed ratios for topology stranding. Following the ranking, the apparatus, such as the processing circuitry, of an example embodiment is configured to select the predefined number or predefined percentage of the intersections that are most highly ranked in terms of speed ratio, that is, which have the greatest speed ratios, for purposes of topology stranding.

By evaluating the speed ratios of the DT intersections and then selecting a subset of the intersections for topology stranding based upon the speed ratios, the method, apparatus 20 and computer program product of an example embodiment are configured to identify those intersections that most frequently experience greater variations in the speed of travel between the different lanes of the link immediately upstream of the intersection, such as the DBT link, than other intersections. Thus, this selection of a subset of the intersections permits the processing resources associated with the generation of strands and the subsequent collection and processing of lane level traffic information to be prioritized for those intersections having the greatest speed ratios and, therefore, having the greatest likelihood of creating lane level traffic speed variations along the links upstream of the DBT link. Additionally, the election of the subset of intersections conserves the processing resources that may otherwise be consumed to similarly generate strands and to collect and process lane level traffic information for other intersections having lower speed ratios and that are therefore less likely to create variations in lane level traffic speeds for the links upstream of a DBT link.

FIGS. 4 and 8 illustrate flowcharts depicting a method according to an example embodiment of the present invention. It will be understood that each block of the flowcharts and combination of blocks in the flowcharts may be implemented by various means, such as hardware, firmware, processor, circuitry, and/or other communication devices associated with execution of software including one or more computer program instructions. For example, one or more of the procedures described above may be embodied by computer program instructions. In this regard, the computer program instructions which embody the procedures described above may be stored by a memory device 24 of an apparatus 20 employing an embodiment of the present invention and executed by the processing circuitry 22. As will be appreciated, any such computer program instructions may be loaded onto a computer or other programmable apparatus (for example, hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks.

Accordingly, blocks of the flowcharts support combinations of means for performing the specified functions and combinations of operations for performing the specified functions for performing the specified functions. It will also be understood that one or more blocks of the flowcharts, and combinations of blocks in the flowcharts, can be implemented by special purpose hardware-based computer systems which perform the specified functions, or combinations of special purpose hardware and computer instructions.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Furthermore, in some embodiments, additional optional operations may be included. Modifications, additions, or amplifications to the operations above may be performed in any order and in any combination.

Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

That which is claimed:

1. A method for defining a strand upstream of a direction based traffic (DBT) link, the method comprising:
   extending the strand so as to include one or more links upstream of the DBT link, wherein extending the strand comprises determining whether a link is to be added to the strand based upon evaluation of a termination criteria, and wherein the termination criteria is at least partially based upon a relationship of a function class of the link to the function class of one or more other links; and
   in an instance in which the termination criteria is satisfied, ceasing further extension of the strand.

2. A method according to claim 1 wherein, in an instance in which the link is associated with an intersection upstream of the DBT link, the termination criteria is at least partially based upon a difference in the function class of the link and the function class of the one or more other links associated with the intersection.

3. A method according to claim 2 wherein, in an instance in which the termination criteria is not satisfied, extending the strand comprises extending the strand through the intersection to a selected link of the one or more other links that is selected based upon the function class of the selected link relative to the function class of the one or more other links associated with the intersection.

4. A method according to claim 3, wherein the selected link is selected based upon the function class of the selected link being the smallest of the function classes of the one or more other links associated with the intersection.

5. A method according to claim 2 wherein the termination criteria is at least partially based upon the function class of the link differing from the function class of at least a predetermined number of the one or more other links by at least a predefined amount.

6. A method according to claim 1 wherein the termination criteria is also based on a length of the strand.

7. A method according to claim 1 wherein the termination criteria is also based on whether the link is associated with a stop sign or a stop light.

8. An apparatus for defining a strand upstream of a direction based traffic (DBT) link, the apparatus comprising at least one processor and at least one non-transitory memory including computer program code instructions, the computer program code instructions configured to, when executed by the at least one processor, cause the apparatus to:
   extend the strand so as to include one or more links upstream of the DBT link, wherein extending the strand comprises determining whether a link is to be added to the strand based upon evaluation of a termination criteria, and wherein the termination criteria is at least partially based upon a relationship of a function class of the link to the function class of one or more other links; and
   in an instance in which the termination criteria is satisfied, cease further extension of the strand.

9. An apparatus according to claim 8 wherein, in an instance in which the link is associated with an intersection upstream of the DBT link, the termination criteria is at least partially based upon a difference in the function class of the link and function class of one or more other links associated with the intersection.

10. An apparatus according to claim 9 wherein, in an instance in which the termination criteria is not satisfied, the computer program code instructions configured to extend the strand comprise computer program code instructions configured to extend the strand through the intersection to a selected link of the one or more other links that is selected based upon the function class of the selected link relative to the function class of the one or more other links associated with the intersection.

11. An apparatus according to claim 10 wherein the selected link is selected based upon the function class of the selected link being the smallest of the function classes of the one or more other links associated with the intersection.

12. An apparatus according to claim 10 wherein the termination criteria is at least partially based upon the function class of the link differing from the function class of at least a predetermined number of the one or more other links by at least a predefined amount.

13. An apparatus according to claim 8 wherein the termination criteria is also based on a length of the strand.

14. An apparatus according to claim 8 wherein the termination criteria is also based on whether the link is associated with a stop sign or a stop light.

\* \* \* \* \*